United States Patent [19]

Fujisaka et al.

[11] Patent Number: 4,989,008
[45] Date of Patent: Jan. 29, 1991

[54] SPOTLIGHT MAPPING RADAR SYSTEM

[75] Inventors: Takahiko Fujisaka; Yoshimasa Oh-hashi, both of Kanagawa, Japan

[73] Assignee: Mitsubishi Denki Kabushiki Kaisha, Tokyo, Japan

[21] Appl. No.: 472,342

[22] Filed: Jan. 30, 1990

[30] Foreign Application Priority Data

Oct. 2, 1989 [JP] Japan ................................ 1-31651

[51] Int. Cl.$^5$ ............................................. G01S 13/00
[52] U.S. Cl. ....................................... 342/25; 342/191
[58] Field of Search .................. 342/25, 190, 191, 373

[56] References Cited

U.S. PATENT DOCUMENTS 4,656,479 4/1987 Kirimoto et al. ...................... 342/94
4,815,045 3/1989 Nakamura ............................. 342/25

OTHER PUBLICATIONS

Ruvin et al., "Digital Multiple Beamforming Techniques for Radar," IEEE 1978.
"Radar Technology" Artech House, 1976 Chapter 18.

Primary Examiner—Thomas H. Tarcza
Assistant Examiner—Mark Hellner
Attorney, Agent, or Firm—Wolf, Greenfield & Sacks

[57] ABSTRACT

The receiving apparatus of a spotlight mapping radar system is provided with a digital beamforming antenna capable of converting the echo signals received by a plurality of antenna elements into corresponding digital signals and processing them by DFT and forming a plurality of reception beams oriented in different directions at the same time to enhance the cross-range resolution without reducing the distance measurement capability and the measurable range. Pulse compressors, azimuth compressors, display buffers and reference signal generators are provided respectively for each of the outputs of the digital beamforming antenna for outputting the plurality of reception beams. An output picture synthesizing apparatus synthesizes signals representing the picture information from the respective display buffers and outputs the synthesized signals to a display to display thereon the synthesized picture of an object to be observed.

8 Claims, 3 Drawing Sheets

SPOTLIGHT MAPPING RADAR SYSTEM

BACKGROUND OF THE INVENTION

1. Technical Field of the Invention

The present invention relates to a spotlight mapping radar system which is provided on a radar platform attached to an air vehicle such as an artificial satellite, an aircraft and the like, and is adapted to obtain the image of a stationary object to be observed which is situated on the ground or surface of the sea by utilizing a beam stabilizing function.

2. Description of the Prior Art

The spotlight mapping radar system of this type according to the prior art is described in detail for example in Brookener, E. ed. "Radar Technology", chapter 18, Artech House., 1976. In this book, the constitution and the principle of this system is summarized as below.

FIG. 1 is a block diagram illustrating an embodiment of a spotlight mapping radar system according to the prior art. FIGS. 2 to 4 are intended to explain the operating principle and the working of the mapping system.

In FIGS. 1 to 4, numeral 1 designates a transmitter, numeral 2 a duplexer, numeral 3 an antenna, numeral 4 a receiver, numeral 5 a pulse compressor, numeral 6 an azimuth compressor, numeral 7 a display buffer, numeral 9 a display, numeral 10 a reference signal generator, numeral 11 an inertial navigation system, numeral 12 an antenna driving apparatus, numeral 13 a transmission signal, numeral 14 a received signal, numeral 15 an object to be observed, numeral 16 one spot in the object 15 to be observed, numeral 17 an antenna beam, and numeral 18 an air vehicle on which the spotlight mapping radar system is installed.

The antenna 3 is oriented by the antenna driving apparatus 12 toward the object 15 to be observed in accordance with the location and the speed of the air vehicle 18 which are measured by the inertial navigation system 11. Subsequently, the transmitted pulse signal generated by the transmitter 1 is emitted as a transmitted signal (in the form of a radio wave) by way of the duplexer 2 and the antenna 3 toward the stationary object 15 to be observed which is situated on the ground or surface of the sea. The transmitted signals 13 are reflected by the object 15 to be observed and received by the antenna 3 as the received signal 14 (or an echo signal). The received signal 14 is input into the receiver 4 by way of the duplexer 2. The receiver 4 amplifies the received signal 14 in the form of a radio frequency wave, detects it, and converts the detected signal into a video signal in a baseband. This video signal is input into the pulse compressor 5 and is processed by means of pulse compression in order to enhance the range resolution. The pulse compression enables the resolution in the direction perpendicular to the direction of flight or the distance (that is range) direction to be enhanced. In this case, the range resolution $\Delta R$ is expressed by the equation:

$$\Delta R = \frac{C\tau}{2} \quad (1)$$

(wherein C is the velocity of light and $\tau$ is the pulse width after pulse compression). Subsequently, the video signal is input into the azimuth compressor 6 so that the cross-range resolution in the flying direction or the azimuth direction of the air vehicle 18 can be enhanced. Azimuth compression is attained by utilizing the Doppler effect caused by movement of the air vehicle 18 with the spotlight mapping radar system installed thereon.

Suppose that the air vehicle 18 shown in FIG. 2 is moving in the rectilinear direction at a constant speed v, and one point 16 in the object 15 to be observed is located at the distance $R_0$ and the squint angle $\theta_0$ when the time $t=0$. At this instance, the relative distance R(t) between the air vehicle 18 and the point 16 at the time of t is expressed by the equation:

$$R(t) = \sqrt{R_0^2 - 2R_0 vt\cos\theta_0 + v^2 t^2} \quad (2)$$

Accordingly, the instantaneous Doppler frequency fd(t) of the reception signal is provided by employing the transmission wave length of $\lambda$;

$$fd(t) = \frac{2}{\lambda} \cdot \frac{vR_0\cos\theta_0 - V^2 t}{\sqrt{R_0^2 - 2R_0 vt\cos\theta_0 + v^2 t^2}} \quad (3)$$

As can clearly be seen from the third equation, the reception signal is a chirp signal in which the instantaneous Doppler frequency varies as the time t varies. In this case, since the parameters such as $\lambda$, $R_0$, $\theta_0$, v in the third equation are known or can be measured by the inertial navigation system 11, the history of variation of the Doppler frequency of the spot 16 corresponding to lapse of time or the Doppler history can be calculated by the reference signal generator 10. Accordingly, azimuth compression is made available for each range in a similar manner to pulse compression by correlating a series of reception signals with the reference signal generated by the reference signal generator 10.

In general, $\theta_0$ is set as $\theta_0=\pi/2$ in a spotlight mapping radar system. At this time, the synthetic aperture time T is determined, not by the antenna beam width $\theta_B$ but by the variable range $\theta_S$ of the azimuth angle of the antenna driving apparatus 12 (in the case where the boresight direction of the antenna beam is movable in the range from $(\pi-\theta_S)/2$ to $(\pi+\theta_S)/2$ on the basis of the flying direction of the air vehicle 18) and is expressed by the equation;

$$T = \frac{2R_0\tan\left(\frac{\theta_S}{2}\right)}{v} \quad (4)$$

Supposing that the synthetic aperture time is T, the crossrange resolution $\Delta r$ can be expressed by the equation;

$$\Delta r = \frac{\lambda}{2} \sqrt{(R_0/vT)^2 + (1/2)^2} \quad (5)$$

Processed as above described, the reception signal of which resolution has been enhanced in both range direction and azimuth direction is stored in the display buffer 7 as the picture information and displayed on the display 9 as two dimensional radar picture images.

The required pulse repetition frequency PRF is expressed by the equation;

$$PRF \geq \frac{2v\theta_B}{\lambda} \qquad (6)$$

As can clearly be seen from the fifth equation, the longer the synthetic aperture time T is, the more the crossrange resolution $\Delta r$ may be enhanced. On the other hand, the observation range may be decided by the products $R\theta_B$ of the beam width $\theta_B$ and the distance R. Accordingly, if the observation time T which is identical to the synthetic aperture time T is equal to or less than the time when the radar platform (or the air vehicle) passes, that is $R\theta_B/v$, the observation regions are consecutive as shown in FIG. 3. However, if the observation time T is extended to more than $R\theta_B/v$, the observation regions become discontinuous as shown in FIG. 4. In order to prevent discontinuity of said observation regions; if the beam width $\theta_B$ is extended and the observation time T is also extended while the limitation of $T \leq R\theta_B/v$ is satisfied, then the pulse repetition frequency PRF must be made higher as can clearly be seen by the sixth equation, and as a result, range ambiguity is caused so that observation of a remote region is impossible.

SUMMARY OF THE INVENTION

The present invention has been proposed to solve the problems as mentioned above and an object of the present invention is to provide a spotlight mapping radar system capable of enhancing the cross-range resolution without reducing the distance measurement capability and the measurable range.

This object is achieved by a spotlight mapping radar system provided on a moving radar platform to obtain the picture of a stationary object to be observed comprising: a transmission means for transmitting a radio wave toward the object; a reception means for receiving the radio wave reflected from the object as an echo signal; a pulse compression means for enhancing the range resolution of the received echo signal; an azimuth compression means for enhancing the cross-range resolution of the received echo signal; a reference signal generating means for generating a reference signal required for the azimuth compression; a display buffer means for storing the received echo signal which have ben processed by the compression means and said azimuth compression means, as the signal representing the picture information of the object; a display means for displaying the picture of the object to be observed in accordance with the signal representing the picture information output from the display buffer means; and an inertial navigation system for measuring the movement of the radar platform to control the transmission means and the reference signal generating means, characterized in that the reception means includes a digital beamforming antenna means which has a plurality of antenna elements and which is capable of converting the echo signals received by the plurality of antenna elements into corresponding digital signals and digitally processing them to form and output a plurality of reception beams oriented in different directions at the same time. The pulse compression means, said azimuth compression means, the display buffer means and the reference signal generating means rae provided for each of the outputs of said digital beamforming antenna means at which the plurality of reception beams are output. An output picture synthesizing means for synthesizing the signals representing the picture information output from the respective display buffer means and outputting the synthesized signals to the display means is provided.

The present invention is characterized in that the width of the transmission beam is made wider and when the beams are to be received, a plurality of reception beams of narrower width having different directions are formed at the same time by using the digital beam forming antenna means so that each of the beams is limited to a narrow width keeping the pulse repetition frequency low, and the plurality of reception beams are synthesized, and thereby the cross-range resolution can be enhanced without reducing the distance measurement capability and the measurable range.

The foregoing and other objects and features will become apparent upon reading the novel aspects as defined in the description taken in conjunction of the accompanying drawings and the appended claims.

BRIEF EXPLANATION OF THE DRAWINGS

Throughout the accompanying drawings, like numerals designate like or equivalent members.

DESCRIPTION OF THE PREFERRED EMBODIMENT

Figure 6:
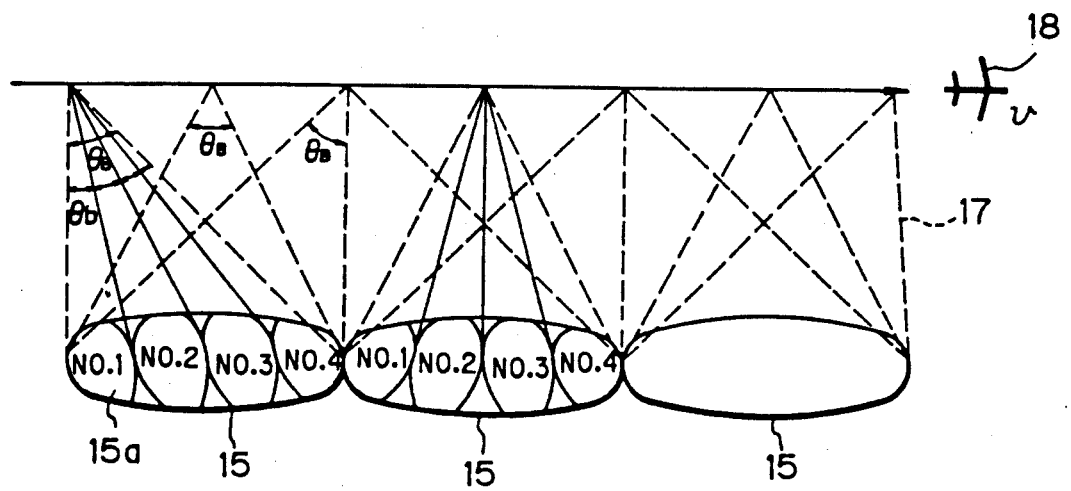
FIG. 6 is a diagram explaining the operation of the present invention.
Figure 1:
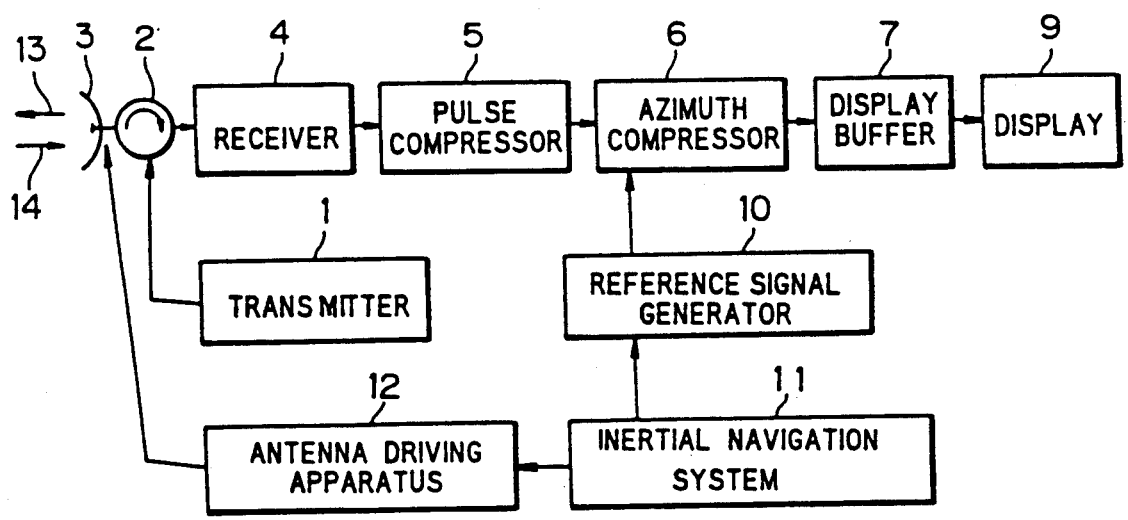
FIG. 1 illustrates the constitution of the spotlight mapping radar system according to the prior art.
Figure 2:
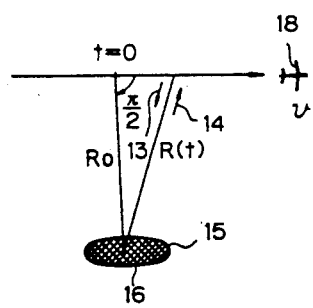
FIGS. 2 to 4 illustrate operational examples of the spotlight mapping radar system according to the prior art shown in FIG. 1.
Figure 3:
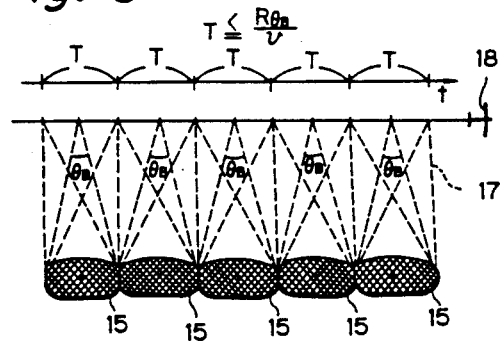
Figure 4:
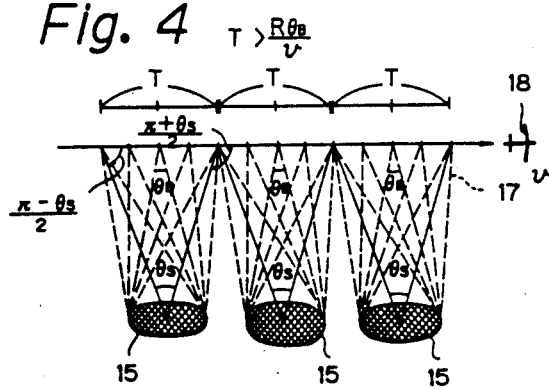

An embodiment of the present invention will now be explained by referring to the drawings. Components the same as those of a prior art are designated by the same numerals.

Figure 5:
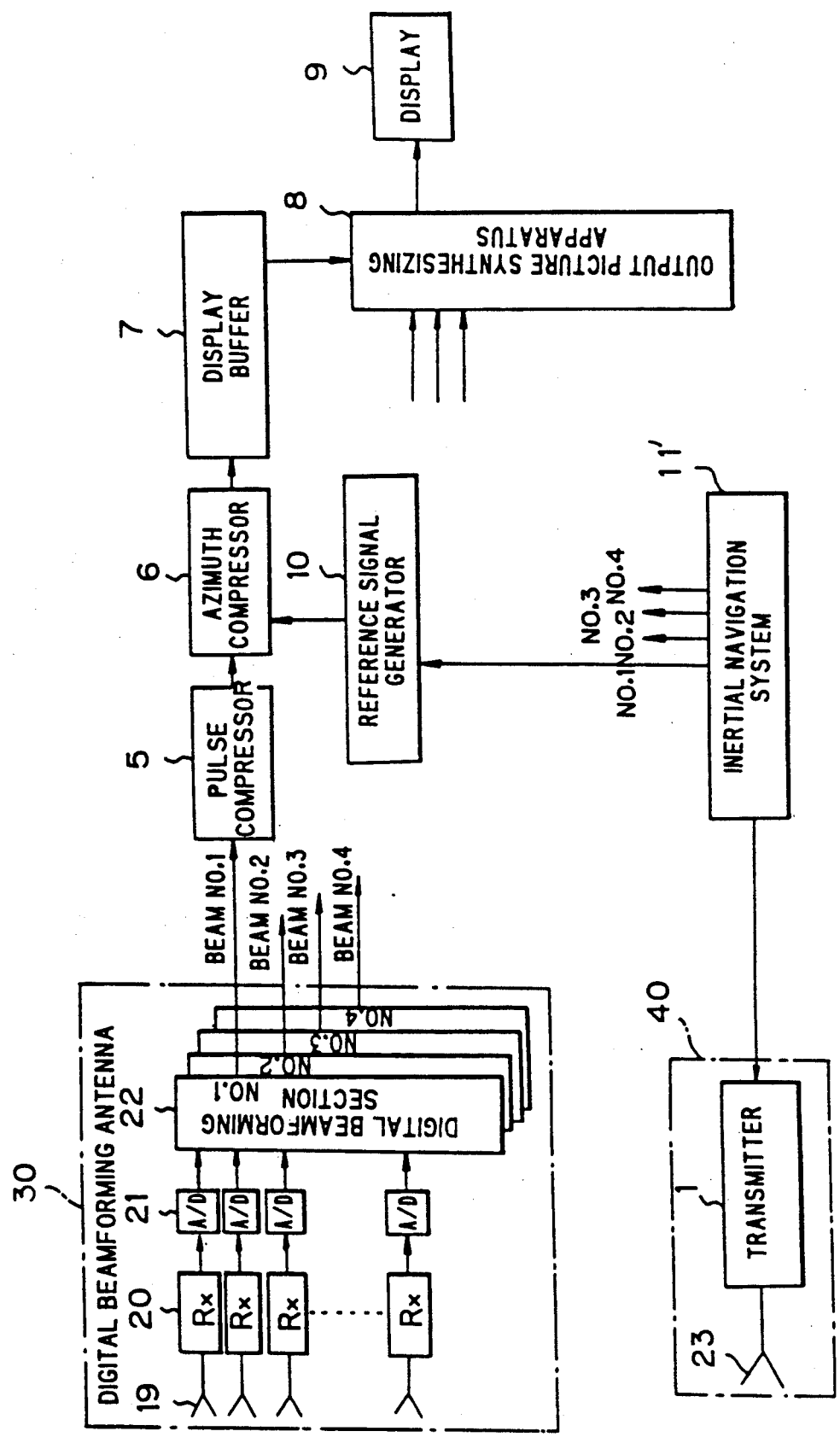
FIG. 5 illustrates the constitution of one embodiment of the present invention.

FIG. 5 illustrates the constitution of a preferred embodiment of a spotlight mapping radar system of the present invention, which is installed on a radar platform (not shown). In FIG. 5, numeral 19 designates a plurality of antenna elements arranged in one dimensional or two dimensional arrangements, numeral 20 the receivers provided for each antenna element 19 to receive radio waves through the antenna element 19, numeral 21 the analog-to-digital (A/D) converters provided for each receiver 20 to convert the analog signal output from the receivers 20 into a corresponding digital signal, and numeral 22 a plurality of digital beam forming sections which receive a plurality of digital signals transferred simultaneously from the respective A/D converters 21, process them by means of Discrete Fourier Transform (DFT) internally to discriminate the respective radio waves received in different directions, and form and output a plurality of digital beams corresponding to the respective directions. The above-mentioned components from the antenna elements 19 to the digital beamforming sections 22 constitute a digital beamforming (DBF) antenna 30 capable of forming a plurality of reception beams oriented in different directions at the same time without scanning. The present invention employs the digital beamforming antenna 30 as the reception means. For each output of the respective digital beamforming sections 22 (four sections in its case) there is provided a pulse compressor 5, an azimuth compressor 6, a display buffer 7 and a reference signal generator 10. The output of the respective display buffer 7 is connected to the display device 9 by way of an output picture synthesizing apparatus 8. The inertial navigation system 11' is adapted to apply the outputs corresponding to the respective reception beams from the digital beamforming antenna 30 to the respective reference signal generators 10 also corresponding to the respective reception beams, and to individually control the respective reference signal generators 10. Numeral 23 designates a transmission antenna, which may be comprised of a phased-array antenna which is well known as an antenna capable of electronically scanning the beams, and constitutes the transmission means 40 together with the transmitter 1. The beam transmission direction of the phased-array antenna 23 is controlled by the inertial navigation system 11.

Operation of the system shown in FIG. 5 will now be explained by referring to FIG. 6.

The transmission signal having a wide beam width $\theta_B$ is transmitted toward the object 15 to be observed from the transmitter 1 through the transmission antenna 23. At this time, assuming that the distance from the radar platform to the object 15 to be observed is R and the observation region is S, the beam width $\theta_B$ is $\theta_B = S/R$ since the relation $S = R\theta_B$ may be applied.

On the other hand, the digital beamforming antenna 30 is used to receive the transmission signals reflected from the object 15 as echo signals. The digital beamforming antenna 30 forms four reception beams No. 1 to No. 4 having a narrow beam width (beam width $\theta_b = \theta_B/4$) directed toward the respective sub-regions 15a in the object 15 to be observed and receive the echo signals at the same time from the respective sub-regions 15a. The respectively received echo signals cause the range resolution and the cross-range resolution to be enhanced by the corresponding pulse compressor 5 and azimuth compressor 6 and to be stored in the respective display buffer 7. It is to be noted that at this time, the inertial navigation system 11' outputs the parameters corresponding to the respective reception beams to the corresponding reference signal generators 10, which in turn output the corresponding reference signals to the corresponding azimuth compressors 6 and azimuth compression will then take place at the corresponding azimuth compressors 6 for the respective reception beams. The respective picture information stored in the respective display buffers 7 is synthesized by the output picture synthesizing apparatus 8 and displayed at the display device 9 as the picture of the entire object to be observed.

More specifically, the width $\theta_B$ of the transmission beam is increased, and the reception beam is divided into a multiplicity of beams having the quantity of N (where N is integer) by utilizing a digital beamforming antenna 30. Then, since the beam width $\theta_b$ of one reception beam becomes $\theta_b = \theta_B/N$, the possibility of discontinuity within the observation regions can be avoided. Furthermore, the pulse reception frequency PRF required for processing one reception beam is made as:

$$PRF \geq \frac{2v\theta_B}{\lambda} = \frac{2v\theta_B}{\lambda N}$$

whereby the pulse repetition frequency PRF of the present invention is reduced to 1/N times that of the prior art.

In this way, the cross-range resolution can be enhanced by N times that of the prior art without reducing the distance measurement capability and the measurable region.

What is claimed is:

1. A spotlight mapping radar system provided on a moving radar platform to obtain the picture of a stationary object to be observed comprising:
   a transmission means for transmitting a radio wave toward said object;
   a reception means for receiving said radio wave reflected from said object as an echo signal;
   a pulse compression means for enhancing the range resolution of said received echo signal;
   an azimuth compression means for enhancing the crossrange resolution of said received echo signal;
   a reference signal generating means for generating a reference signal required for the azimuth compression;
   a display buffer means for storing said received echo signal which has been processed by said compression means and said azimuth compression means, as the signal representing the picture information of said object;
   a display means for displaying the picture of said object to be observed in accordance with the signal representing the picture information output from said display buffer means; and
   an inertial navigation system for measuring the movement of said radar platform to control said transmission means and said reference signal generating means, characterized in that:
   said reception means includes a digital beam forming antenna means which has a plurality of antenna elements, and which is capable of converting the echo signals received by said plurality of antenna elements into corresponding digital signals and digitally processing them to form and output a plurality of reception beams oriented in different directions at the same time;
   said pulse compression means, said azimuth compression means, said display buffer means and said reference signal generating means are provided respectively for each of the outputs of said digital beam forming antenna means at which said plurality of reception beams are output; and
   an output picture synthesizing means for synthesizing the signals representing the picture information output from said respective display buffer means and outputting said synthesized signals to said display means is provided.

2. A spotlight mapping radar system as claimed in claim 1 wherein said digital beamforming antenna means of said reception means includes receivers connected respectively to said plurality of antenna elements, A/D converters connected respectively to said receivers to convert the signals output from said receivers into corresponding digital signals, and a plurality of digital beamforming sections for processing said corresponding digital signals by means of DFT to discriminate the respective waves received in different directions and forming and outputting a plurality of digital beams corresponding to said different directions.

3. A spotlight mapping radar system as claimed in claim 1 wherein said transmission means includes a phased-array antenna capable of electrically scanning beams.

4. A spotlight mapping radar system provided on a moving radar platform to obtain the picture of a stationary object to be observed comprising:

a transmission means for transmitting a radio wave toward said object;

a reception means for receiving said radio wave reflected from said object as an echo signal;

a pulse compression means for enhancing the range resolution of said received echo signal;

an azimuth compression means for enhancing the cross-range resolution of said received echo signal;

a reference signal generating means for generating a reference signal required for the azimuth compression;

a display means for displaying the picture of said object to be observed in accordance with said received echo signal which has been processed by said compression means and said azimuth compression means and which represents the picture information of said object; and an inertial navigation system for measuring the movement of said radar platform to control said transmission means and said reference signal generating means, characterized in that:

said reception means comprises beam forming means, having a plurality of outputs, for processing said received echo signal and for producing a plurality of reception beams oriented in different directions at the same time; and said pulse compression means, said azimuth compression means, and said reference signal generating means are provided respectively for each of the outputs of said beam forming means at which said plurality of reception beams are present.

5. A spotlight mapping radar system as claimed in claim 4 wherein said beam forming means comprises a digital beam forming antenna means, having a plurality of antenna elements, for converting the echo signals received by said plurality of antenna elements into corresponding digital signals, and for processing said digital signals to form said plurality of reception beams.

6. A spotlight mapping radar system as claimed in claim 5 wherein said digital beam forming antenna means comprises a plurality of receivers connected respectively to said plurality of antenna elements, a plurality of analog-to-digital converters connected respectively to said plurality of receivers to convert signals output from said receivers into corresponding digital signals, and a plurality of digital beam forming sections for processing said corresponding digital signals by means of discrete Fourier transforms to discriminate the respective waves received in different directions and for producing a plurality of digital beams corresponding to said different directions.

7. A spotlight mapping radar system as claimed in claim 4 wherein said display means comprises:

a plurality of display buffer means, each of which is provided for one of said azimuth compression means, for storing the digital data representing the picture information of said object, output from the corresponding azimuth compression means; and an output picture synthesizing means for combining the digital data representing the picture information output from said plurality of display buffer means into a composite picture display.

8. A spotlight mapping radar system as claimed in claim 4 wherein said transmission means comprises a phased-array antenna capable of electrically scanning.

* * * * *

UNITED STATES PATENT AND TRADEMARK OFFICE
CERTIFICATE OF CORRECTION

PATENT NO. : 4,989,008
DATED : January 29, 1991
INVENTOR(S) : Takahiko Fujisaka and Yoshimasa Oh-hashi It is certified that error appears in the above-identified patent and that said Letters Patent is hereby corrected as shown below:

Title page, item (30);

Please correct the priority date of Japanese patent 1-31651 to -- February 10, 1989 --.

Signed and Sealed this

Twenty-fourth Day of November, 1992

Attest:

DOUGLAS B. COMER

*Attesting Officer*  *Acting Commissioner of Patents and Trademarks*